(12) United States Patent
Bloebaum et al.

(10) Patent No.: US 8,311,478 B2
(45) Date of Patent: *Nov. 13, 2012

(54) DEVICE AND METHOD FOR CONTENT SEARCHING BETWEEN PEER DEVICES

(75) Inventors: L. Scott Bloebaum, Cary, NC (US); Charles Liu, Chapel Hill, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 0 days.

This patent is subject to a terminal disclaimer.

(21) Appl. No.: 13/165,505

(22) Filed: Jun. 21, 2011

(65) Prior Publication Data

US 2011/0248831 A1 Oct. 13, 2011

Related U.S. Application Data

(63) Continuation of application No. 11/538,087, filed on Oct. 3, 2006, now Pat. No. 7,965,981.

(60) Provisional application No. 60/827,574, filed on Sep. 29, 2006.

(51) Int. Cl.
*H04B 5/00* (2006.01)

(52) U.S. Cl. ............... 455/41.1; 455/41.2; 455/41.3
(58) Field of Classification Search ............... 455/41.1, 455/41.2, 41.3, 412.1, 426.1, 426.2, 517
See application file for complete search history.

(56) References Cited

U.S. PATENT DOCUMENTS

| | | | |
|---|---|---|---|
| 2004/0117831 A1* | 6/2004 | Ellis et al. | 725/53 |
| 2005/0278114 A1* | 12/2005 | Ahmad | 701/211 |
| 2005/0289113 A1* | 12/2005 | Bookstaff | 707/1 |
| 2007/0021067 A1* | 1/2007 | Kim et al. | 455/41.2 |

* cited by examiner

*Primary Examiner* — Tuan H Nguyen
(74) *Attorney, Agent, or Firm* — Renner, Otto, Boisselle & Sklar, LLP

(57) ABSTRACT

A portable communication device is equipped to search for content stored on a target electronic device. The portable communication device transfers user-defined content search query to an electronic device via a near-field communications (NFC) module. The portable communication device receives search results from the electronic device via the NFC module and indicates to the user that search results have been received from the electronic device. The portable communication device facilitates content searching and data transfer between two devices.

13 Claims, 5 Drawing Sheets

DEVICE AND METHOD FOR CONTENT SEARCHING BETWEEN PEER DEVICES

RELATED APPLICATION DATA

The present application claims the benefit of U.S. Provisional Application Ser. No. 60/827,574, filed Sep. 29, 2006, the disclosure of which is herein incorporated by reference in its entirety.

TECHNICAL FIELD OF THE INVENTION

The present invention relates generally to portable communication devices, and, more particularly, to a portable communication device and method for searching a target electronic device.

DESCRIPTION OF RELATED ART

In recent years, portable communication devices, such as mobile phones, personal digital assistants, mobile terminals, etc., continue to grow in popularity. As the popularity of portable communication devices continues to grow, today's wireless landscape is rapidly changing as mobile phones and networks are being enhanced to provide features and services beyond voice communications. The wireless industry is experiencing a rapid expansion of mobile data services. In addition, the features associated with certain types of portable communication devices have become increasingly diverse. To name a few examples, many portable communication devices have cameras, text messaging capability, Internet browsing functionality, electronic mail capability, video playback capability, audio playback capability, image display capability, position sensing capability and hands-free headset interfaces.

Many, if not all, portable communication devices are capable of storing data. The data may take many forms, examples of which include contact list entries, audio files (e.g., an MP3 file containing or otherwise representative of music), image files (e.g., a JPG file containing or otherwise representative of a photograph), video files (e.g. an MPEG4 file containing or otherwise representative of a motion video), application data files (e.g., word processing documents or spreadsheets), and the like.

Given the wide range of functionality available with today's portable communication devices, the amount of both user- and commercially-generated content stored on portable communication devices is increasing rapidly.

SUMMARY

In view of the foregoing, a need exists for additional mobile data services, and application programs for providing additional mobile data services, such as application programs that facilitate searching content stored on target electronic devices, such as searching for content stored on a another mobile phone, on a personal computer or on a media server.

One aspect of the invention relates to a method of searching for content stored on a target electronic device that includes receiving search query from a user, wirelessly transmitting the search query to the target electronic device, and wirelessly receiving search results from the target electronic device.

According to another aspect, wirelessly transmitting includes transmitting the search query to the target electronic device via a near-field communications (NFC) link.

According to another aspect, wirelessly receiving includes wirelessly receiving search results from the target electronic device via a near-field communications (NFC) link.

According to another aspect, the method is carried out using a portable communication device including a near-field communications (NFC) module.

According to another aspect, the wirelessly transmitting and wirelessly receiving are performed via a near-field communications (NFC) module while the portable communication device is in proximity to the target electronic device.

According to another aspect, the method further includes wirelessly transmitting a content request to the target electronic device, the content request including at least one item from the received search results, and wirelessly receiving data from the target electronic device, the received data being representative of at least one item from the content request.

According to another aspect, the wirelessly transmitting is performed via near-field communications (NFC), Bluetooth and/or wide local area network (WLAN).

According to another aspect, the target electronic device is a mobile telephone.

According to another aspect, the target electronic device is a media server or a personal computer.

According to another aspect, the receiving wirelessly transmitting and wirelessly receiving steps are executed by a portable communication device.

According to another aspect, the wirelessly transmitting and wirelessly receiving steps are performed when the portable communication device is in proximity to the target electronic device.

Another aspect of the invention relates to a program stored on a machine-readable medium, the program being suitable for use in a portable communication device, wherein loading the program into and executing the program from the memory in the portable communication device causes the portable communication device to wirelessly transmit user-defined content search query to an electronic device, wirelessly receive search results from the target electronic device, and indicate to a user that search results have been received from the target electronic device.

According to another aspect, the program causes the portable communication device to wirelessly transmit and wirelessly receive via a near-field communications (NFC) link.

According to another aspect, the program causes the portable communication device to request the target electronic device to provide one or more items of content indicated as present in the target electronic device by the received search results.

According to another aspect, the program causes the portable communication device to transmit information enabling the target electronic device to establish a separate communication link with the portable communication device for transfer of one or more items of content requested by the portable communication device.

According to another aspect, the program causes the portable communication device to wirelessly receive data from the target electronic device, the received data being representative of at least one item of content.

According to another aspect, a portable communication device includes a memory, a near-field communications (NFC) module and a controller that executes an application program within the memory, where the application program, when executed, causes the portable communication device to wirelessly transmit user-defined search query to a remote electronic device, wirelessly receive search results from the target electronic device, and indicate to a user of the portable communication device that search results have been received from the target electronic device.

Another aspect of the invention relates to a method of sharing stored content with a portable communication device that includes wirelessly receiving a search query from the portable communication device, executing the received search query, the executing step returning search results, and wirelessly transmitting the search results to the portable communication device.

According to another aspect, wirelessly receiving a search query includes receiving the content search query via a near-field communications (NFC) module.

According to another aspect, wirelessly transmitting the search results to the portable communication device includes transmitting the search results via a near-field communications (NFC) module.

According to another aspect, the method further includes wirelessly receiving a content request, the content request including at least one item included in the transmitted search results, and wirelessly transmitting data to the portable communication device, the transmitted data being representative of at least one item from the content request.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended thereto.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF DRAWINGS

Many aspects of the invention can be better understood with reference to the following drawings. The components in the drawings are not necessarily to scale, emphasis instead being placed upon clearly illustrating the principles of the present invention. Likewise, elements and features depicted in one drawing may be combined with elements and features depicted in additional drawings. Moreover, in the drawings, like reference numerals designate corresponding parts throughout the several views.

DETAILED DESCRIPTION OF EMBODIMENTS

Figure 1:
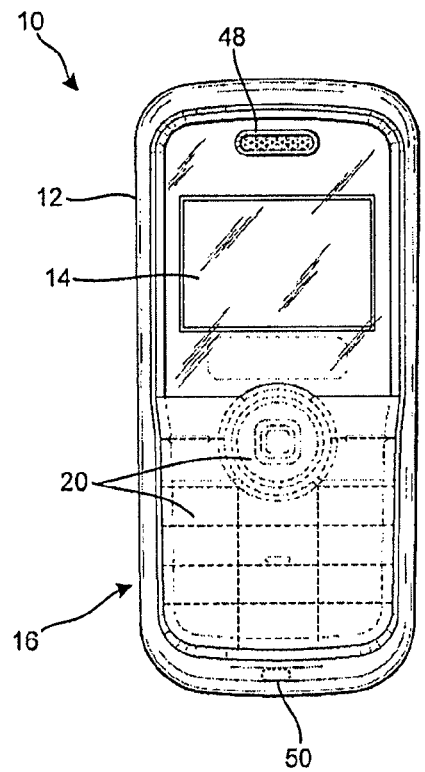
FIG. 1 is a diagrammatic illustration of a mobile telephone as an exemplary portable communication device.

In the detailed description that follows, like components have been given the same reference numerals regardless of whether they are shown in different embodiments of the present invention. To illustrate the present invention in a clear and concise manner, the drawings may not necessarily be to scale and certain features may be shown in somewhat schematic form.

As used herein, the term "portable communication device" includes portable radio communication equipment. The term "portable radio communication equipment", which herein after may be referred to as a mobile phone, a mobile device, a mobile radio terminal or a mobile terminal, includes all electronic equipment, including, but not limited to, mobile telephones, pagers, communicators, i.e., electronic organizers, smartphones, personal digital assistants (PDAs), or the like. While the present invention is being discussed with respect to portable communication devices, it is to be appreciated that the invention is not intended to be limited to portable communication devices, and can be applied to any type of electronic equipment capable of being used for voice and/or data communication, e.g., a near-field communications (NFC)-enabled communication device.

In addition, as used herein the terms "electronic device" and "target electronic device" include portable radio communication equipment. The term "portable radio communication equipment", which herein after may be referred to as a mobile phone, a mobile device, a mobile radio terminal or a mobile terminal, includes all electronic equipment, including, but not limited to, mobile telephones, pagers, communicators, i.e., electronic organizers, smartphones, personal digital assistants (PDAs), or the like. While the present invention is being discussed with respect to portable communication devices, it is to be appreciated that the invention is not intended to be limited to portable communication devices, and the terms "electronic device" and "target electronic device" include any type of electronic equipment on which content is stored, e.g., a personal computer or media server.

Figure 2:
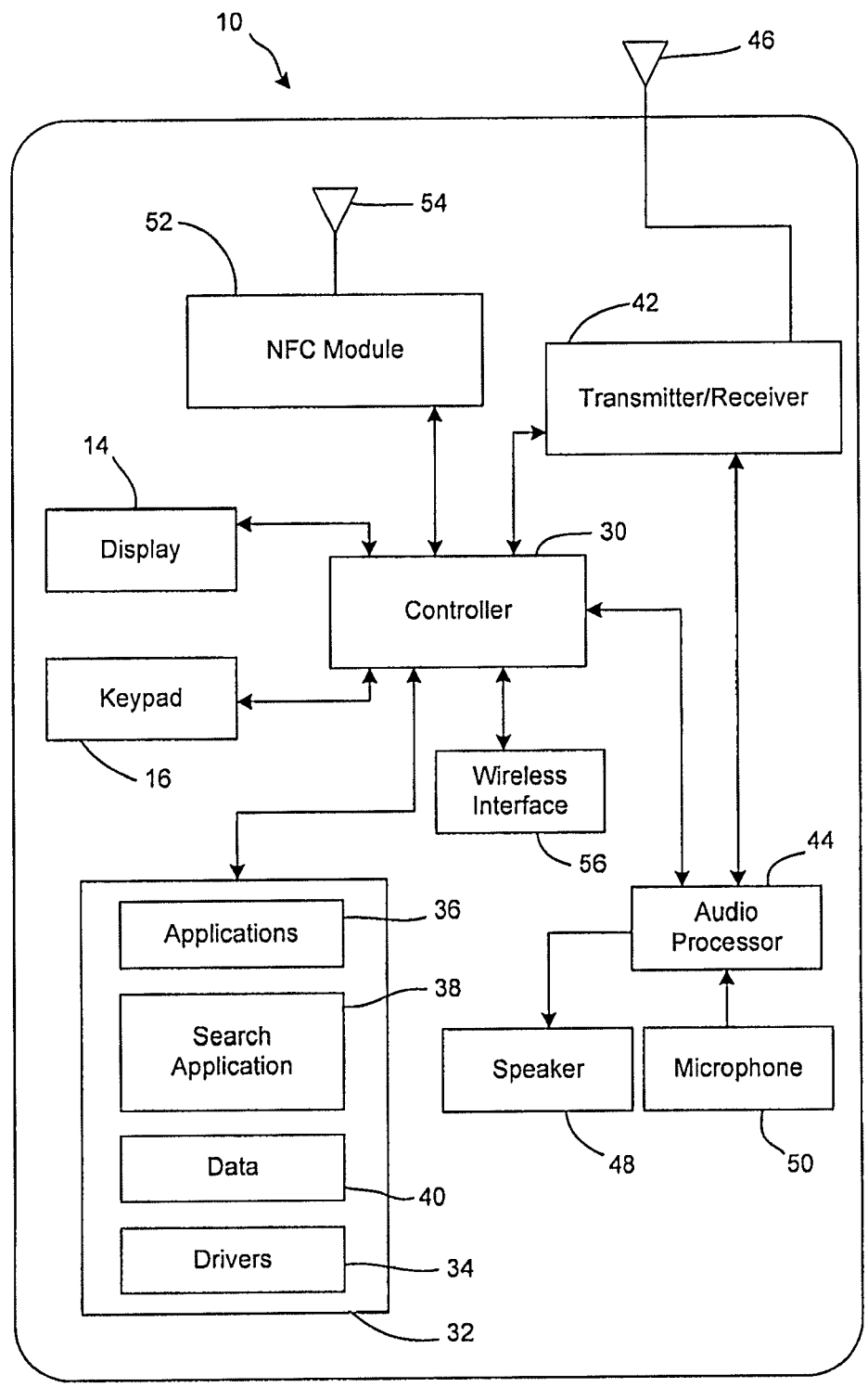
FIG. 2 is a diagrammatic illustration of a portable communication device in accordance with aspects of the present invention.

Referring initially to FIG. 1 and FIG. 2, an exemplary embodiment of a portable communication device 10, e.g., a mobile phone, mobile terminal or the like, is depicted. As is described more fully below, the portable communication device 10 includes a search application (e.g., an application program, code or logic routine that is executed by the portable communication device) and a wireless interface device (e.g., a near-field communication (NFC) module that enables searching of target electronic devices such as other portable communication devices, personal computers, media servers or the like). In addition, the target electronic device may execute an application program or other logic routine comprising hardware and software operations to support a search function and to return search results in response to a received search query.

Stated differently, the portable communication device 10 supports a content search application by including hardware and/or application program appropriate for searching content stored on a target electronic device. For purposes of the discussion herein, portable communication device 10 will be described in terms of wirelessly transmitting a search query to a target electronic device and receiving search results from the target electronic device.

The portable communication device in the illustrated embodiments is a mobile telephone, and may be referred to as the mobile telephone 10. As indicated, the description and illustrations of a mobile telephone for the portable communication device is intended to serve as a non-limiting exemplary environment for the inventive concepts described herein. The mobile telephone 10 is shown as having a "brick" or "block" form factor housing 12, but it will be appreciated that other types of housings, such as a clamshell housing or a slide-housing, may be utilized.

The mobile telephone 10 includes a display 14 and keypad 16. As is conventional, the display 14 displays information to a user, such as operating state, time, telephone numbers, contact information, various navigational menus and the like, which enable the user to utilize the various features of the mobile telephone 10. The display 14 also may be used to visually display content received by the mobile telephone 10 and/or retrieve from a memory 32 (FIG. 2) of the mobile telephone 10.

Similarly, the keypad 16 may be conventional in that it provides for a variety of user input operations. For example, the keypad 16 typically includes alphanumeric keys 20 for facilitating entry of alphanumeric information, such as telephone numbers, phone lists, contact information, notes and the like. In addition, the keypad 16 typically includes special function keys, such as a "call send" key for initiating or answering a call, and a "call end" key for ending or "hanging up" a call. Special function keys also may include menu navigation keys, for example, for navigating through a menu displayed on the display to select different telephone functions, profiles, settings, etc., as is conventional. Other keys associated with the mobile telephone may include a volume key, an audio mute key, an on/off power key, a web browser launch key, a camera key and the like. Keys or key-like functionality also may be embodied as a touch screen associated with the display 14. While some embodiments of the search application may not involve keypad-based user interaction with the mobile telephone 10, other embodiments may include keypad interaction with the search application, such as entering search query, setting up various other options, data selection and the like.

The mobile telephone 10 includes conventional call circuitry that enables the mobile telephone 10 to establish a call or otherwise exchange signals with a call/calling device, typically another mobile telephone, landline telephone or other electronic device. However, the call/calling device need not be another telephone, but may be some other device, such as an Internet web server, content providing server, media server or the like. The call circuitry also may be responsible for transmitting text messages that are prepared by the user.

FIG. 2 represents a functional block diagram of a portable communication device 10. The portable communication device 10 includes a controller 30 that controls the overall operation of the portable communication device. The controller 30 may include any commercially available or custom microprocessor or microcontroller. Memory 32 is operatively connected to the controller 30 for storing control programs and data used by the portable communication device. The memory 32 is representative of the overall hierarchy of memory devices containing software and data used to implement the functionality of the portable communication device in accordance with one or more aspects described herein. The memory 32 may include, for example, RAM or other volatile solid-state memory, Flash or other non-volatile solid-state memory, a magnetic storage medium such as a hard disk drive, a removable storage media, or other suitable storage means. In addition to handling voice communications, the portable communication device 10 may be configured to transmit, receive and process data, such as text messages (also known as SMS), electronic mail messages, multimedia messages (also known as MMS), image files, video files, audio files, ring tones, streaming audio, streaming video, data feeds (e.g., podcasts) and so forth.

In the illustrated embodiment, memory 32 stores drivers 34 (e.g., I/O device drivers), application programs 36, including a search application program 38, and application program data 40. The I/O device drivers include software routines that are accessed through the controller 30 (or by an operating system (not shown) stored in memory 32) by the application programs, including the search application program 38, to communicate with devices such as the display 14 and other input/output ports.

The application programs, including the search application program 38, comprise programs that implement various features of the portable communication device 10, such as voice calls, e-mail, Internet access, contact manager and the like. As is described more fully below, the search application program 38 comprises a program, logic routine or code that enables the user of the portable communication device to search the content stored on a target electronic device and, optionally, facilitates the transfer of data representative of search content to be transferred to the user's portable communication device.

A person having ordinary skill in the art of computer programming, and specifically in applications programming for mobile phones, will consider it obvious in view of the description provided herein how to program a mobile phone to operate and carry out the functions described herein with respect to the search application 38 (and any interfacing between the search application program 38 and other application programs, e.g., messaging application programs, media application programs and the like). Accordingly, details as to the specific programming code have been left out. Also, while the search functionality is carried out via the controller 30 and search application 38 (alone or in conjunction with other application programs) in memory 32 in accordance with inventive aspects, such function also could be carried out via dedicated hardware, firmware, software or combinations thereof without departing from the scope of the present invention.

With continued reference to FIG. 2, the controller 30 interfaces with the aforementioned display 14 and keypad 16 (and any other user interface device), a transmitter/receiver 42 (often referred to as a transceiver), audio processing circuitry, such as an audio processor 44, and a position determination element (not shown), such as a global positioning system (GPS) receiver.

An antenna 46 is coupled to the transmitter/receiver 42 such that the transmitter/receiver 42 transmits and receives signals via antenna 46, as is conventional. The portable communication device includes an audio processor 44 for processing the audio signals transmitted by and received from the transmitter/receiver. Coupled to the audio processor 44 are a speaker 48 and microphone 50, which enable a user to listen and speak via the portable communication device. Audio data may be passed to the audio processor 44 for playback to the user. The audio data may include, for example, audio data from an audio file stored in the memory 32 and retrieved by the controller 30. The audio processor 44 may include any appropriate buffers, decoders, amplifiers and the like.

In the illustrated embodiment, the portable communication device 10 also includes a near-field communication (NFC)

module 52 (also referred to as an NFC chipset, an NFC transceiver, an NFC interface, an NFC adaptor or the like) or other comparable communication components (e.g., a close-proximity data transceiver) to establish a localized communication link with a compatible component of another device (e.g., a target electronic device or portable communication device, when the devices are brought in relatively close proximity to each other). The term NFC generally is used to refer to a magnetic-field induction communication interface and protocol that was jointly developed by Sony and Phillips and which has been adopted as standard by ECMA (ECMA-340) and ISO/IEC (ISO/IEC 18092). The NFC module 52 is coupled to or otherwise includes a NFC coupler 54, e.g., including an inductor or coil in the form of an antenna. NFC generally has a working distance of about 0 centimeters to several tens of centimeters (or more). NFC may be used in a passive communication mode where an initiator device provides a carrier field and that is answered by modulating the existing field with a transponder, which may draw operating power from the initiator-provided electro-magnetic field. NFC also may be used in an active communication mode where both the initiator and transponder communicates by generating their own fields in, in which case, both the initiator and transponder typically receive power from a power supply. NFC may be used to configure and initiate another wireless network connection or interface between devices, such as Bluetooth and WiFi connections.

As will be appreciated, the illustration and description of an NFC module 52 is meant to be an example of a close-proximity communication device and any appropriate device to establish a localized communication link may be used and may include devices that rely on a capacitive coupling technique, a propagating wave, e.g., electromagnetic, technique, a radio frequency transmission technique, e.g., such as the techniques used for RF identification (RFID) devices, a magnetic field induction technique or any other appropriate techniques.

The portable communication device also may include one or more local wireless interfaces (indicated generally as wireless interface 56), such as an infrared transceiver and/or an RF adapter, e.g., a Bluetooth adapter, WLAN adapter, WiFi adapter and the like, for establishing communication with an accessory, a hands free adapter, e.g., a headset that may audibly output sound corresponding to audio data transferred from the portable communication device 10 to the adapter, another mobile radio terminal, a computer, or any other electronic device. As will be appreciated, the local wireless interface 56 may be used to transmit data, e.g., a user-defined search query, from the portable communication device 10 when the portable communication device functions as on originating or requesting device during a search transfer operation, and receives data from another device (e.g., a target electronic device) when the portable communication device functions as a target for a search operation and/or a data transfer operation.

Figure 3:
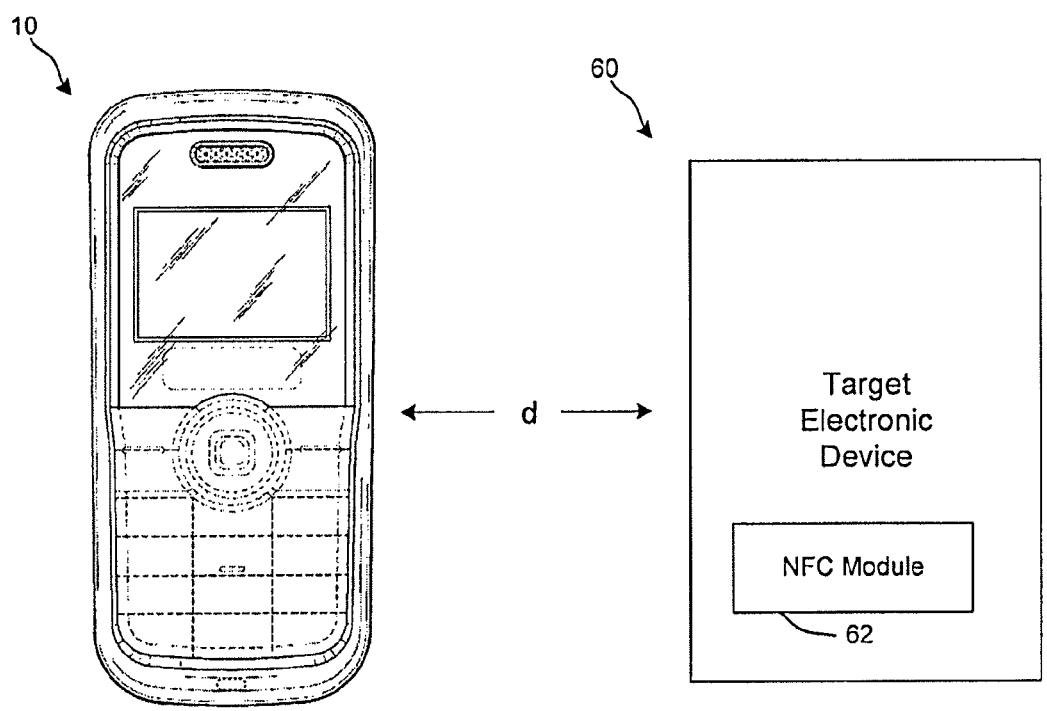
FIG. 3 is a diagrammatic illustration of a portable communication device in proximity to an electronic device.

With reference now to FIG. 3, aspects of the method, device and system described herein will be described with respect to a portable communication device 10 that searches content located or otherwise stored on a target electronic device 60, e.g., a portable communication device, a personal computer, a media server or the like, when the portable communication device 10 is in proximity to the target electronic device 60. The target electronic device 60 includes an NFC module 62 that is capable of performing near-field communication with the portable communication device 10 (via the NFC module coupled to the portable communication device). While the method, device and system described herein are being described with respect to an NFC link between the portable communication device and target electronic device 60, it will be appreciated that one or more other wireless interfaces or communication links may be used to transfer data, e.g., search query, search results and/or data representative of content stored on the target electronic device 60, between the portable communication device 10 and the target electronic device 60.

As one of ordinary skill in the art will appreciate, NFC means and includes communication that can be accomplished when the portable communication device 10 and the target electronic device 60 are "in proximity" or "in relative proximity," e.g., within a distance "d" of one another, where distance "d" is between 0 centimeters and several tens of centimeters (including when the housings of the portable communication device 10 and the target electronic device 60 are in contact with one another).

Figure 4:
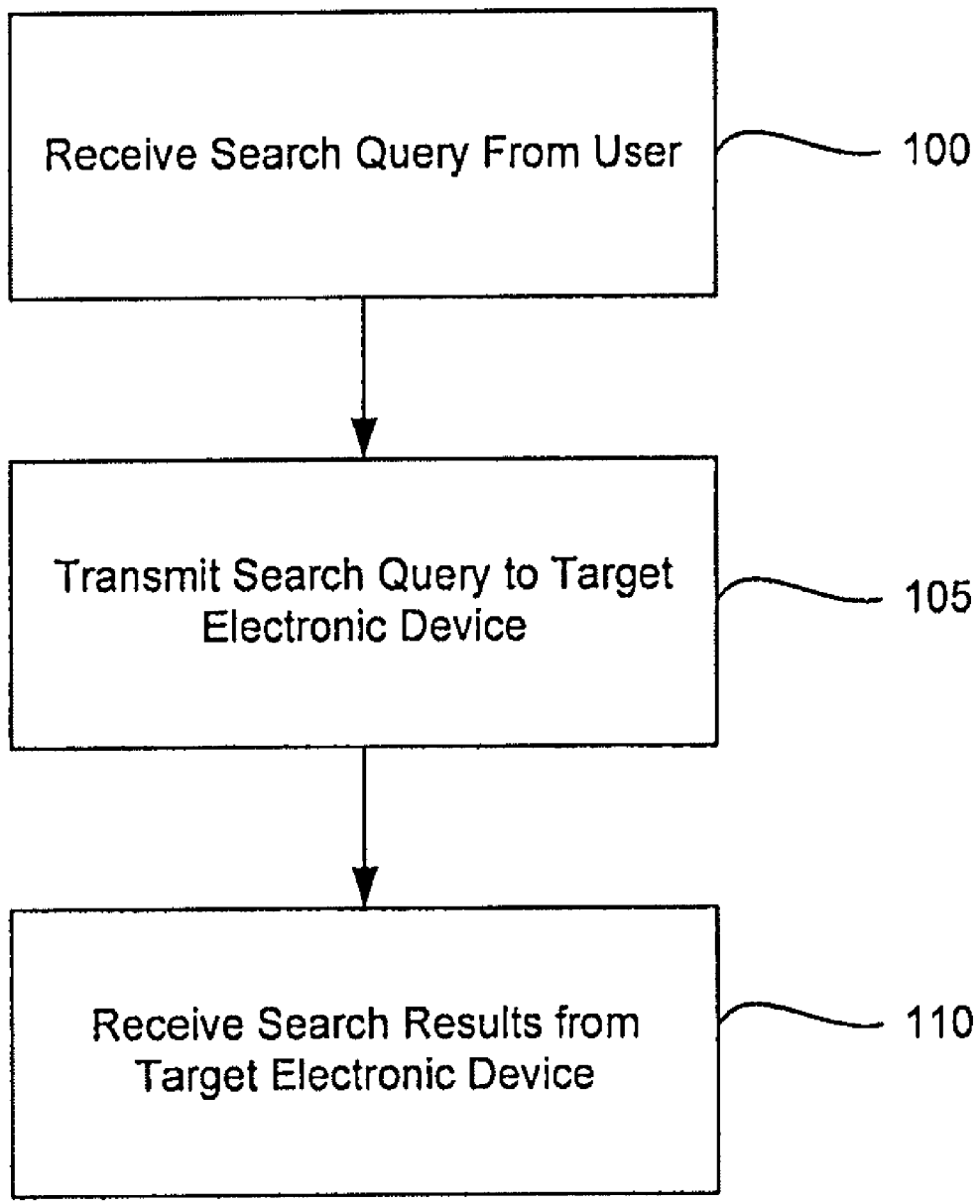
FIG. 4 is a flow chart or functional diagram representing a method of searching for content stored on a target electronic device in accordance with aspects of the present invention.
Figure 5:
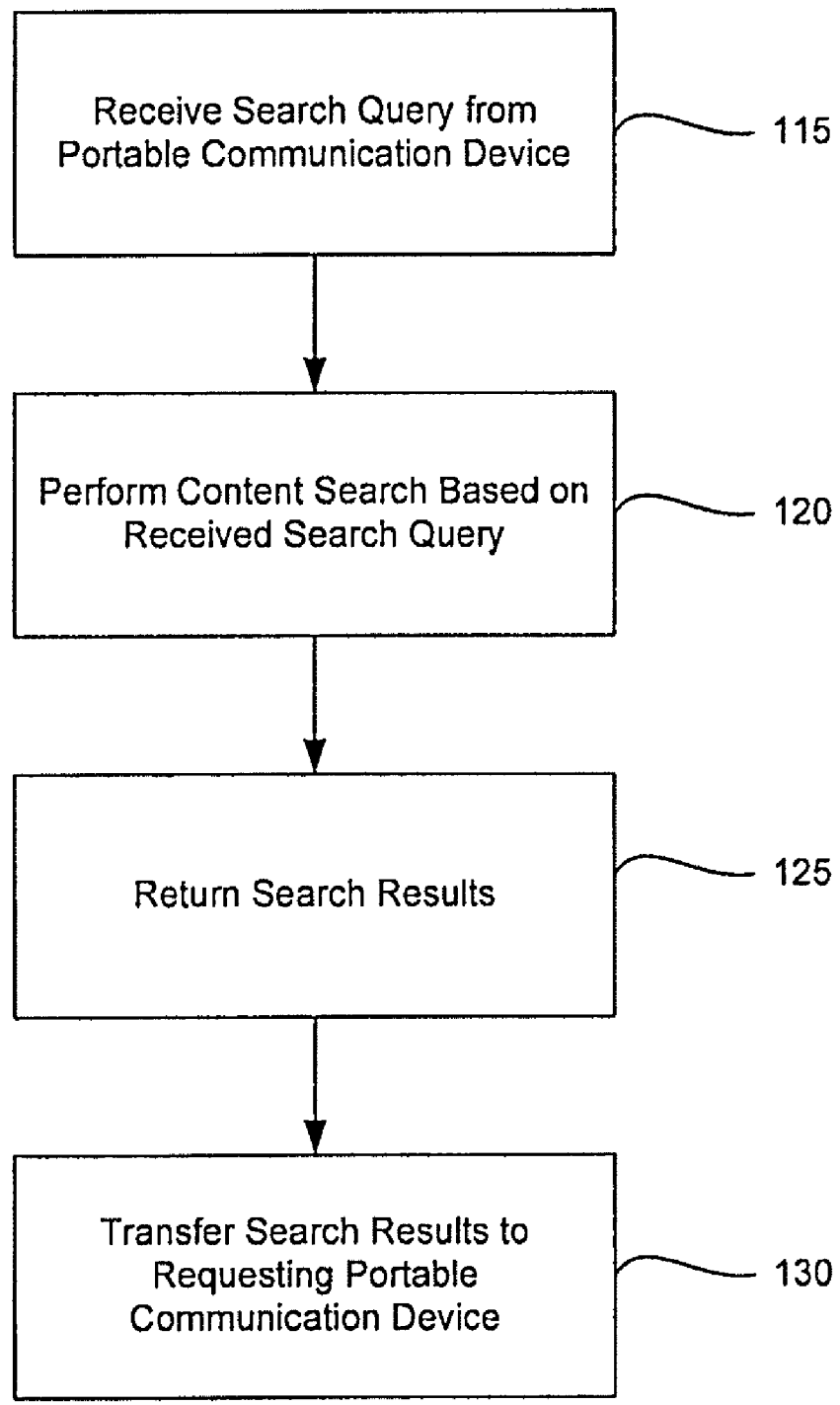
FIG. 5 is a flow chart or functional diagram representing a method of sharing content with a portable communication device in accordance with aspects of the present invention.
Figure 6:
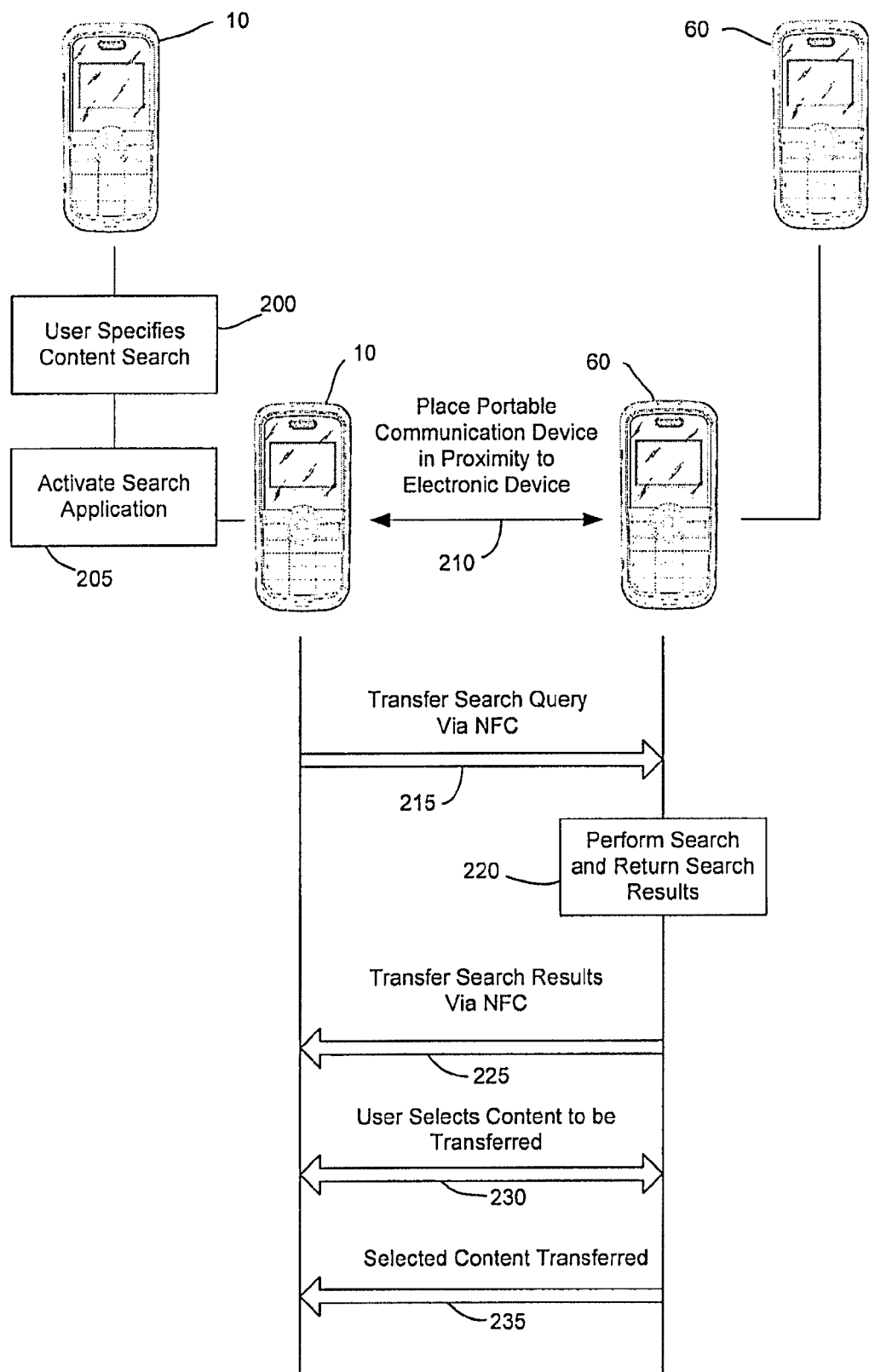
FIG. 6 is a flow chart or functional diagram representing the relevant operation of a portable communication device in accordance with aspects of the present invention.

While for purposes of simplicity of explanation, the flow charts or diagrams in FIGS. 4-6 include a series of steps or functional blocks that represent one or more aspects of the relevant operation of the portable communication device 10 and/or the target electronic device 60. It is to be understood and appreciated that aspects of the invention described herein are not limited to the order of steps or functional blocks, as some steps or functional blocks may, in accordance with aspects of the present invention occur in different orders and/or concurrently with other steps or functional blocks from that shown or described herein. Moreover, not all illustrated steps or functional blocks of aspects of relevant operation may be required to implement a methodology in accordance with an aspect of the invention. Furthermore, additional steps or functional blocks representative of aspects of relevant operation may be added without departing from the scope of the present invention.

The methodologies illustrated in FIGS. 4-6 relate to using a short-range communication interface, e.g., a near-field communication (NFC) interface to conduct content searches between two devices, e.g., between a requesting portable communication device and a target electronic device. Turning now to FIG. 4, a method of searching content stored on a target electronic device begins at functional block 100 where the portable communication device (sometimes referred to herein as the requesting portable communication device or the searching portable communication device) receives search query from a user of the portable communication device. For example, a user of the portable communication device may activate the search application and enter or otherwise specify some criteria for the content search, e.g., by selecting metadata of one or more media files that already are stored on the user's portable communication device, (e.g., artist or track name of an audio file, subject of a photo, or the like) or by manually entering search query into the portable communication device, for example, using the keypad. At functional block 105, the user-defined search query are wirelessly transmitted to the target electronic device. In a preferred embodiment, the wireless transfer of the user-defined search query includes transfer of the search query via an NFC link between the portable communication device and the target electronic device once the portable communication device and the target electronic device are in close proximity to one another (e.g., a sufficiently close distance for conducting near-field communications).

At functional block 110, the requesting portable communication device receives search results form the target electronic device, where the search results include results returned in response to the previously transferred search query. In a preferred embodiment, the wireless receiving of the search results from the target electronic device is accomplished via an NFC link between the target electronic device and the requesting portable communication device. The received search results can be displayed to the user of the requesting portable communication device in any appropriate format, e.g., in the form of lists, thumbnails, links or the like. In one embodiment, after the search results from the target electronic device have been received by the requesting portable communication device, a visual, auditory and/or tactile signal or other indication may be given to the user of the requesting portable communication device (as well as the user of the target electronic device in an embodiment where the target electronic device is another portable communication device).

Referring now to FIG. 5, a method of sharing stored content, e.g., media content, such as music files, video files, saved e-mail messages, word processing files and the like, with a remote portable communication device, e.g., a mobile phone, begins at functional block 115 where an electronic device, e.g., a portable communication device, a personal computer, a media server or the like, receives a search query from a remote portable communication device. In a preferred embodiment, the search query from the remote portable communication device is received via an NFC link between the portable communication device and the electronic device on which the content is stored. As is discussed above, the remote portable communication device can be in relative proximity to (e.g., within a range of 10 centimeters) or even in physical contact with the electronic device, such as the housings touching one another. The received search query can be made up of search criteria or any suitable information for initiating a search of content stored on the electronic device, such as a number of key terms, metadata terms or other relevant information for a search query.

At functional block 120, the electronic device performs a content search based on the received search query. The content search performed by the electronic device can include a search of all files stored within a memory of the content device. Alternatively, the content search may include a search for a certain type of file or files stored in a certain location. In one embodiment, the electronic device may be equipped with a privacy feature, e.g., a privacy folder or other means for designating certain files as private, and, therefore, not subject to the content search based on the received search query. Of course, the electronic device has the option of rejecting the search query, for example, in response to a user of the electronic device automatically selecting a reject search query option and/or by providing the user of the electronic device with the option of rejecting or otherwise refusing a search query after the search query is received by the electronic device. At functional block 125, the electronic device returns search results based on the content search performed responsive to the received search query. The returned search results may be presented in any suitable form, including, but not limited to, lists of files, thumbnails, links, or other information indicative of returned search results.

At functional block 130, the electronic device transfers or otherwise transmits the search results to the requesting portable communication device, for example, via the NFC link between the electronic device and the requesting portable communication device. Of course, another wireless interface could be used for return or transfer of the search results to the requesting portable communication device without departing from the scope of the present invention. Optionally, after the transfer of results is complete, an indication, e.g., a visual, auditory and/or tactile signal, may be given to users of one or both of the requesting portable communication device and the electronic device on which the content is stored. It will be appreciated that protected items may be so indicated in the return search results and/or may not be present at all in the returned search results.

With reference now to FIG. 6, a method of content searching between a pair of devices is provided in the illustrated exemplary embodiment. The method will be described with respect to content searching between a pair of portable communication devices 10 and 60 where the portable communication device 10 is representative of a requesting device, e.g., a device requesting a search of a target electronic device 60. While the target electronic device 60 is illustrated and will be described as a portable communication device, it will be appreciated that the method device and system described herein is applicable to any sort of electronic device, including, but not limited to portable communication devices, personal computers, media servers and the like.

At functional block 200, the user of portable communication device 10 specifies some desired content in the form of a search query. The user of portable communication device 10 may specify any suitable search query for the desired content, such as by selecting metadata of one or more media files that are already stored on the user's portable communication device, e.g., music files corresponding to certain artists, certain photos or certain videos, or by manually entering specific search query. At functional block 205, the user of portable communication device 10 activates the search application. At functional block 210, portable communication device 10 and target electronic device 60 are placed in proximity to one another. As is described above, portable communication device 10 and target electronic device 60 are in proximity to one another when they are within a given distance of one another (e.g., a distance of 10 centimeters or less), such that an NFC session may be established. For purposes of the discussion contained herein, two devices being in proximity with one another is meant to include when the housings of the two devices are in contact with one another. Further, the devices may be further apart than the exemplary proximity range specified herein, depending on the strength, nature or type of the wireless interface used for communication between the two devices. It will be appreciated that functional block 210, which is representative of placing the portable communication device 10 in proximity to target electronic device 60, may take place before or after the steps or actions recited in connection with functional block 200 and 205.

At functional block 215, the search query is wirelessly transmitted from portable communication device 10 to target electronic device 60 by way of an NFC link between portable communication device 10 and target electronic device 60. Alternatively, the search query may be transmitted via a wireless interface other than NFC without departing from the scope of the present invention. At functional block 220, target electronic device 60 performs a search of content stored within its memory and returns search results, e.g., files or content items located during the search. It will be appreciated that the search performed by target electronic device 60 will correspond in whole or in part to the search query transmitted from portable communication device 10 to target electronic device 60, and will include a search of some or all of the content items stored within the various memory portions of target electronic device 60. As is described above, the search results may or may not include content items that have been designated as private or otherwise protected. For example, content items that have been designated as private or protected may not appear in the search results at all. Alternatively, protected or private items may be so indicated in the returned search results. As is discussed above, the search results may be presented in any suitable form including, but not limited to lists of content items, thumbnails associated with content items, links to content items or any other suitable search list format.

At functional block 225, the search results returned by target electronic device 60 are transferred to portable communication device 10 via NFC. Of course, it will be appreciated that other wireless interfaces besides NFC may be employed without departing from the scope of the present invention. Optionally, once the transfer of search results via NFC is complete (functional block 225), one or both users of portable communication device 10 and target electronic device 60 may receive an indication that the transfer is complete, e.g., a visual, auditory and/or tactile indication.

At functional block 230, the user of portable communication device 10 has the option of selecting one or more items within the returned search results to be transferred or otherwise copied from target electronic device 60 to portable communication device 10. By way of example, the user of portable communication device 10 may browse the search results and optionally select one or more items to be retrieved from target electronic device 60. Of course, content items that have been designated as private or otherwise protected may be so indicated, such that the user of portable communication device 10 does not have the option of selecting these items for transfer or retrieval. Once the user of the portable communication device 10 selects desired content items within the search results to be transferred, the portable communication device will transfer (e.g., via a NFC link) the list of desired content items to the target electronic device. Optionally, the list of desired content items will be accompanied by information enabling the target electronic device 60 to establish a separate communication link with the portable communication device for transfer of the selected content items from the target electronic device 60 to the portable communication device 10 (see functional block 235 below). Alternatively, target electronic device 60 may send a request (e.g., in functional block 225) for information related to establishing a separate communication link. In another alternative embodiment, the target electronic device 60 may offer to the portable communication device 10 (e.g., during the operation represented by functional block 225) the information necessary to establish a separate communication link between the portable communication device 10 and the target electronic device 60. Examples of such information may include the ID or address used by the target electronic device 60 in the other link to be established (e.g., WLAN MAC address) and authentication or security information.

At functional block 235, the selected content items may be transferred from target electronic device 60 to portable communication 10. In one embodiment, portable communication device 10 initiates the transfer by utilizing another wireless interface, e.g., Bluetooth, WLAN or the like. Alternatively, the selected items of content can be retrieved by an NFC link in a manner similar to that described above.

It will be appreciated that the method steps or functional blocks described above may occur during one continuous session between portable communication device 10 and target electronic device 60. Alternatively, the portable communication device 10 and target electronic device 60 may be kept in proximity to one another until functional block 215, where the search query is transferred from portable communication device 10 to target electronic device 60 via NFC, followed by a gap of time, for example, where the user of portable communication device 10 removes the device from the proximity relationship to target electronic device 60, and returns his/her portable communication device 10 to proximity with target electronic device 60 at a later time. In this exemplary embodiment, target electronic device 60 would perform a search and return search results (functional block 220) and then engage in steps or functional blocks 225, 230 and/or 235 once the portable communication device 10 was returned to proximity with target electronic device 60. One application of this exemplary embodiment may include a situation where the user of portable communication device 10 has a short visit with a friend who is in possession of target electronic device 60. In this situation, the search queryed by the user of portable communication device 10 may be transferred to target electronic device 60 followed by a period of time where the users of portable communication device 10 and target electronic device 60 are apart. Subsequently, the users of portable communication device 10 and target electronic device 60 may again visit one another, for example, during a lunch break or other visiting situation. At which point, the remainder of one or more of the functional blocks illustrated in FIG. 6 may be carried out by portable communication device 10 and/or target electronic device 60.

It will be appreciated that a portable communication device having remote content searching functionality provides the user with the capability of conveniently and efficiently searching for specified content or any content stored on the electronic device of a friend. Further, the remote content searching method and device described herein may be employed in connection with a user of the portable communication device searching and/or downloading content from a fixed source, e.g., a personal computer or a fixed media server.

As will be appreciated by one of skill in the art, computer program elements and/or circuitry elements of the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium such as the Internet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner. The computer program product and any software and hardware described herein form the various means for carrying out the functions of the invention in the example embodiments.

Specific embodiments of an invention are disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A method of searching for content stored on a target electronic device, the method comprising:
   receiving a search query from a user of a portable communication device;
   wirelessly transmitting the search query from the portable communication device to the target electronic device via a near-field communications (NFC) link between the portable communication device and the target electronic device; and
   wirelessly receiving search results from the target electronic device via the near-field communications (NFC) link, the search results being responsive to the wirelessly transmitted search query.

2. The method according to claim 1, wherein the wirelessly transmitting and wirelessly receiving are performed via a near-field communications (NFC) module while the portable communication device is in proximity to the target electronic device.

3. The method according to claim 1, further comprising:
   wirelessly transmitting a content request to the target electronic device, the content request including at least one item from the received search results; and
   wirelessly receiving data from the target electronic device, the received data being representative of at least one item from the content request.

4. The method according to claim 3, wherein the wirelessly transmitting is performed via near-field communications (NFC), Bluetooth and/or wide local area network (WLAN).

5. The method according to claim 1, wherein the target electronic device is a mobile telephone.

6. The method according to claim 1, wherein the target electronic device is a media server or a personal computer.

7. The method according to claim 1, wherein the wirelessly transmitting and wirelessly receiving steps are performed when the portable communication device is in proximity to the target electronic device.

8. A program stored on a non-transitory memory, the program being suitable for use in a portable communication device, wherein when the program is loaded in the non-transitory memory in the portable communication device and executed causes the portable communication device to:
   wirelessly transmit user-defined content search query to a target electronic device via a near-field communications (NFC) link;
   wirelessly receive search results from the target electronic device via the near-field communications (NFC) link, the search results being responsive to the wirelessly transmitted user-defined content search query; and
   indicate to a user that search results have been received from the target electronic device.

9. The program according to claim 8, wherein the program causes the portable communication device to request the target electronic device to provide one or more items of content indicated by the received search results as being present in the target electronic device.

10. The program according to claim 9, wherein the program causes the portable communication device to transmit information enabling the target electronic device to establish a separate communication link with the portable communication device for transfer of one or more items of content requested by the portable communication device.

11. The program according to claim 9, wherein the program causes the portable communication device to wirelessly receive data from the target electronic device, the received data being representative of at least one item of content.

12. The portable communication device comprising the memory, a near-field communications (NFC) module and a controller that executes an application program according to claim 8 within the memory.

13. A method of sharing stored content with a portable communication device, the method comprising:
   wirelessly receiving a search query from the portable communication device via a near-field communications (NFC) module;
   executing the received search query, the executing step returning search results;
   and
   wirelessly transmitting the search results to the portable communication device via the near-field communications (NFC) module.

* * * * *